(No Model.)

B. THOENS.
DECORTICATING MACHINE.

No. 361,381. Patented Apr. 19, 1887.

WITNESSES
J. A. Rutherford
Robert Sprudt

INVENTOR
Burchard Thoens.
By James L. Norris.
Atty.

N. PETERS, Photo-Lithographer, Washington, D.C.

UNITED STATES PATENT OFFICE.

BURCHARD THOENS, OF NEW ORLEANS, LOUISIANA.

DECORTICATING-MACHINE.

SPECIFICATION forming part of Letters Patent No. 361,381, dated April 19, 1887.

Application filed September 17, 1886. Serial No. 213,825. (No model.)

*To all whom it may concern:*

Be it known that I, BURCHARD THOENS, a citizen of the Empire of Germany, residing at New Orleans, in the parish of Orleans and State of Louisiana, have invented new and useful Improvements in Decorticating-Machines, of which the following is a specification.

This invention has for its object to provide a novel and efficient decorticating-machine for rapidly and effectually separating the wood, bark, and analogous particles from the long fibers of the stalks or stems of cotton, palms, flax, hemp, jute, and other plants, and to provide novel means for subdividing the stalks or stems into narrow strips, breaking such strips transversely into short pieces, flattening the same and removing the loosened or broken particles of wood, bark, and the like from the fibers. These objects I accomplish in the manner and by the means hereinafter described and claimed, reference being made to the accompanying drawings, in which—

Figure 1:
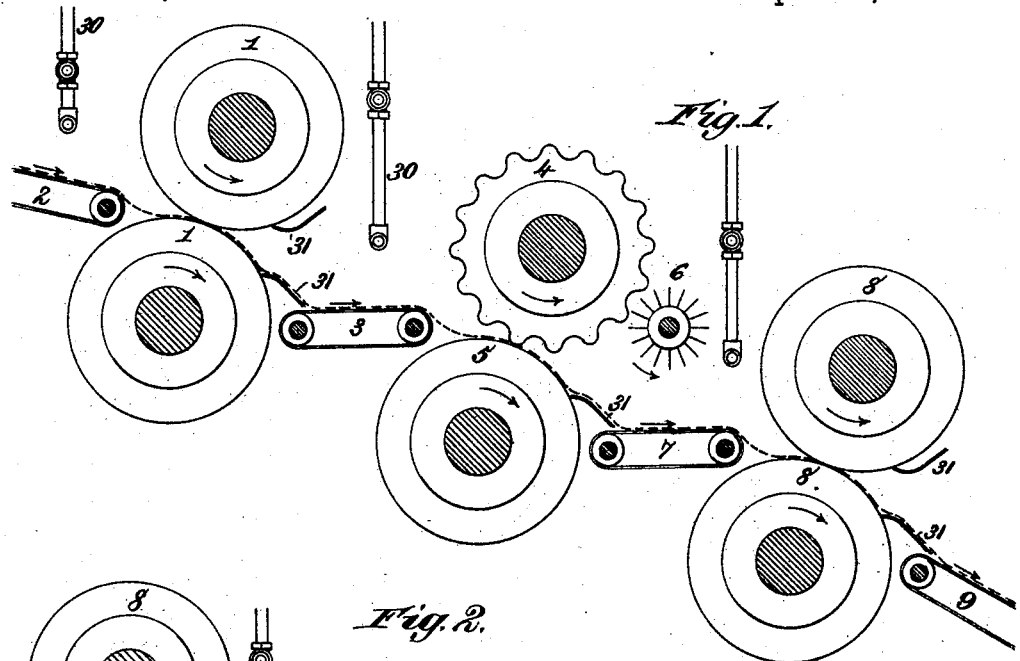
Figure 2:
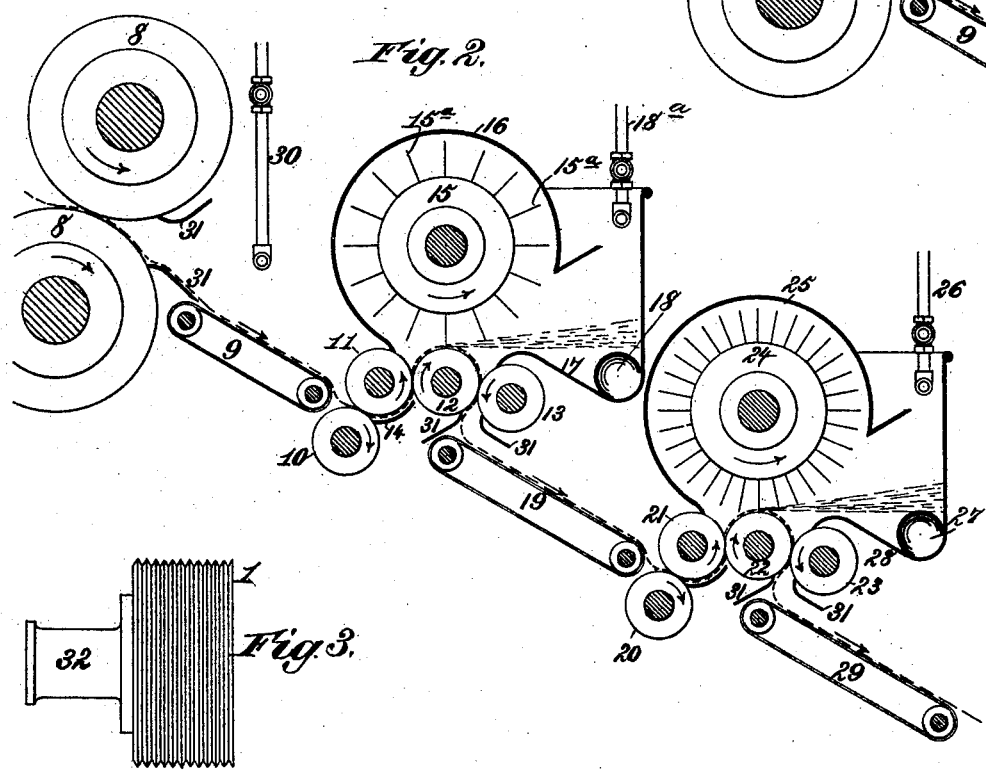
Figure 3:
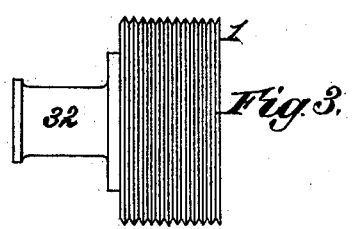

Figures 1 and 2, taken together, represent a vertical sectional view of sufficient of an apparatus to illustrate my invention, and Fig. 3 a detail side view of a portion of one of the stalk crushing and cutting rollers.

In order to enable those skilled in the art to make and use my invention, I will now describe the same in detail, referring to the drawings, where—

The numerals 1 indicate two revolving rollers, each having annular sharpened ridges for crushing and cutting the stalks into narrow strips; 2, an endless-apron conveyer for delivering the stalks to said rollers; 3, a similar conveyer, receiving and carrying the subdivided stalks to a pair of rollers, 4 and 5, the upper one, 4, being longitudinally corrugated, and the lower one, 5, being smooth or plain surfaced, for breaking the strips transversely into short pieces. A brush, 6, is located adjacent to and revolves in a direction the reverse to that of the corrugated roller, to act directly against the latter for freeing it from adhering particles, the brush being used for the reason that it is not practical to employ a rigid scraper-blade in connection with the longitudinally-corrugated strip-breaking roller. An endless-apron conveyer, 7, receives the short pieces from the breaking-rollers and delivers them to two smooth surfaced or plain rollers, 8, rotating in superficial contact, or nearly so, for flattening the mass passing therebetween, from which flattening-rollers the flattened mass is carried by an endless-apron conveyer, 9, between a pair of small rollers, 10 and 11. The mass emerging from this pair of small rollers is directed upward by a guide-plate, 14, to pass around and over a roller, 12, and downward between the latter and another roller, 13, the roller 12 constituting a rotating support for the fibers, while the loosened or broken particles of wood, bark, and analogous substances to be removed are swept off by a rapidly-revolving brush, 15. These small rollers revolve in close proximity to each other, and serve to hold and feed the fibers in a taut condition while the brush acts thereupon, the surface of the rotating roller supporting the fibers while being subjected to such brushing action.

The radial lines $15^a$ indicate the brush-bristles; but instead of bristles I may employ blades or wings for the purpose. The revolving brush removes the loosened or broken particles and deposits them in a well, 17, formed by depressing the bottom wall of a casing, 16, which incloses the brush, said well having an outlet-orifice, 18, through which the detached particles are caused to escape by means of a jet of water introduced into the casing above the wall through a jet-pipe, $18^a$.

The material operated on may be dampened, and thereby softened, at different stages by means of jet-pipes 30, located at appropriate places in the apparatus—as, for example, directly above the endless conveyers 2, 3, 7, and 9.

The brush 15 is of comparatively stiff material, and therefore, to more effectually separate all loosened particles from the fibers, the mass received on a conveyer, 19, beneath the holding-rollers 12 and 13, is delivered to another series of holding-rollers, 20, 21, 22, and 23, and there subjected to the action of another and softer brush, 24, located in a casing, 25, having a jet-pipe, 26, for supplying a jet of water to carry off, through the outlet 27, the particles removed from the fibers and deposited by the brush in the well 28. The fibers thus freed from wood, bark, and other substances that it is desirable to separate therefrom are by a conveyer, 29, delivered to any point where it is desired to collect the same; but such conveyer may, if necessary, deliver the fibers to a third brush and another series of holding-rollers to repeat the brushing operation.

The several parts of the apparatus will be supported by journals, as at 32, in a suitable frame-work, (not shown,) and any appropriate gearing will be provided for operating the rollers, brushes, and conveyers. The transverse breaking of the subdivided stalks can be repeated as often as necessary by introducing into the apparatus the requisite sets of breaking-rollers, and likewise the brushing off from the fibers of the loosened particles of wood, bark, &c., can be repeated by introducing one or more brushes and holding-rollers.

For the purpose of preserving the rollers free from adhering matter, I provide any suitable devices—such, for instance, as scraper-blades, 31.

Having thus described my invention, what I claim is—

1. The combination of a pair of rollers having annular-sharpened projections for crushing and cutting the stalks into strips, a pair of rollers, one of which is plain surfaced and the other corrugated, for breaking the strips transversely, a pair of smooth-surfaced rollers for flattening the transversely-divided strips, a series of rollers for holding the mass passing therebetween, and a rotating brush journaled over the said holding-rollers for removing the loosened or broken particles from the fibers held and fed beneath the brush by the holding-rollers, substantially as described.

2. The combination of a pair of rollers having annular-sharpened projections for crushing and cutting the stalks into strips, a pair of rollers, one of which is corrugated, for breaking the strips transversely, a pair of smooth-surfaced rollers for flattening the transversely-divided strips, a series of rollers for holding the mass passing therebetween, a casing in the lower part of which the holding-rollers are located, and a rapidly-rotating brush inclosed by the casing for removing the loosened or broken particles from the fibers held and fed by the holding-rollers, substantially as described.

3. The combination of a pair of rollers having annular-sharpened projections for crushing and cutting the stalks into strips, a pair of rollers, one of which is corrugated, for breaking the strips transversely, a pair of smooth-surfaced rollers for flattening the transversely-divided strips, a series of rollers for holding the mass passing therebetween, a casing having its bottom wall depressed to form a well, having an outlet-orifice, a rapidly-rotating brush for removing the loosened or broken particles from the fibers held and fed by the holding-rollers and depositing them in the well, and a water-jet for carrying off said particles from the well, substantially as described.

4. The combination, with the crushing and cutting rollers, the breaking-rollers, the flattening-rollers, the holding and feeding rollers, and the brush, of the endless conveyers 3, 7, and 9, arranged, respectively, between the crushing and breaking rollers, the flattening and breaking rollers, and the flattening-rollers and brush, substantially as described.

In testimony whereof I affix my signature in presence of two witnesses.

BURCHARD THOENS.

Witnesses:
FREDERIC COOK,
P. J. HEAVEY.